(12) United States Patent
Koshikawa (10) Patent No.: US 6,704,418 B1
(45) Date of Patent: Mar. 9, 2004

(54) HINGE DEVICE

(75) Inventor: Shinichiro Koshikawa, Yokaichiba (JP)

(73) Assignees: NEC Corporation, Tokyo (JP); Ohsashi Technica, Inc., Tokyo (JP); Sugatsune Kogyo, Co., Ltd., Tokyo (JP)

( * ) Notice: Subject to any disclaimer, the term of this patent is extended or adjusted under 35 U.S.C. 154(b) by 364 days.

(21) Appl. No.: 09/717,367

(22) Filed: Nov. 20, 2000

(30) Foreign Application Priority Data

Nov. 25, 1999 (JP) ............................................. 11-376023

(51) Int. Cl.[7] .......................... H04M 1/00; E05D 11/10; E05C 17/64
(52) U.S. Cl. ...................... 379/433.13; 16/334; 16/341
(58) Field of Search ...................... 379/433.13, 433.12; 455/90; 16/303, 341, 334, 325, 342

(56) References Cited

U.S. PATENT DOCUMENTS 6,175,990 B1 * 1/2001 Kato et al. ............. 379/433.13
6,295,358 B1 * 9/2001 Kubota .................. 379/433.13

FOREIGN PATENT DOCUMENTS

| DE | 22 43 932 A | 3/1974 |
| EP | 0 445 559 A | 9/1991 |
| JP | 7-11831 | 1/1995 |
| JP | 10-317779 | 12/1998 |

* cited by examiner

Primary Examiner—Jack Chiang
(74) Attorney, Agent, or Firm—Brown & Michaels, PC; Eugene Stephens & Associates (57) ABSTRACT

A pair of first conversion faces (55, 55) and a pair of second conversion faces (56, 56) are formed on the end face of a contact member (50) with which a movable member (now shown) comes into contact. The first conversion faces (55, 55) are separated by 180 degrees from each other in the circumferential direction of the contact member (50). The second conversion faces (56, 56) are separated by 180 degrees from each other in the circumferential direction of the contact member (50), and at the same time separated from the first conversion faces (55, 55) by a predetermined angle. The movable member is equipped with a pair of pressing projections which come into contact with the first conversion faces (55, 55) when the cover rotates to its closed position and come into contact with the second conversion faces (56, 56) when the cover rotates to its open position.

5 Claims, 10 Drawing Sheets

HINGE DEVICE

BACKGROUND OF THE INVENTION

The present invention relates to a hinge device which connects the body of a portable telephone or the like with its cover (frame) rotatably.

As disclosed in the Japanese Patent Unexamined Publication No. 7-11831 (1995), this type of a hinge device comprises a pair of hinge members which are connected with a device body and its cover non-rotatably respectively, a movable member which is connected non-rotatably with one of the hinge members mentioned above and movable in a direction of the rotation axis of such pair of the hinges, and an biasing means which presses the movable member against the other hinge member.

Figure 15A:
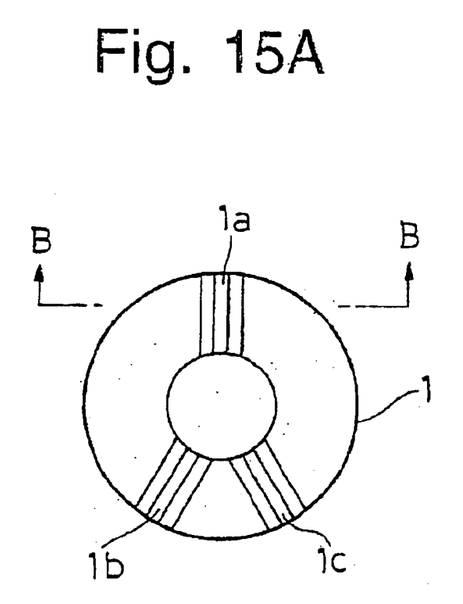
Figure 15B:
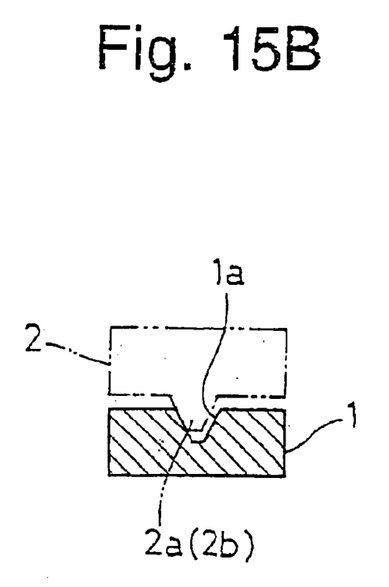
Figure 16A:
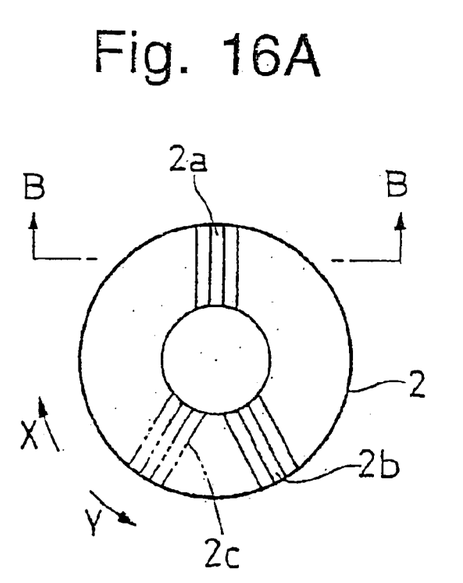
Figure 16B:
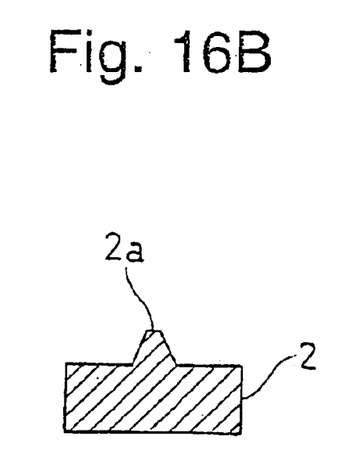

FIG. 15 shows a hinge member 1 of a conventional hinge device mentioned above. Three engaging cavities 1a, 1b, 1c extending in radial directions are formed on the end face of the hinge member with which the movable member 2 comes into contact. The engaging cavities 1a, 1b, 1c are arranged such that the engaging cavities 1b, 1c are separated in opposing directions by the same angle with respect to the engaging cavity 1a. On the other hand, as shown in FIG. 16, the end face of the movable member 2, which is pressed against the hinge member 1, has two contact projections 2a, 2b. These two contact projections 2a, 2b are arranged in such a way that they are separated by the same angle as the angle between the engaging cavities 1a, 1b in a circumferential direction from each other.

When the cover is positioned at the closed position, the contact projections 2a, 2b are engaged with the engaging cavities 1a, 1b respectively. When the cover is positioned at the open position, they are engaged with the engaging cavities 1c, 1a respectively. Actually, as shown in FIG. 15(B), the contact projections 2a (2b) come into contact with the side of the engaging cavities 1a (1b, 1c) so that the cover is kept at its closed or open position.

A pair of hinge devices which connect the cover with the device body rotatably are typically installed on the right and left sides of the device body. Assuming that a hinge member 1 and a movable member 2 as shown in FIGS. 15 and 16 are used for the hinge device which is installed on the right side of the device body, a conventional hinge device has the problem that at least the movable member 2 cannot be used for the hinge device to be installed on the left side, and a dedicated movable member for the left hinge device needs to be manufactured separately.

That is, in the case that the hinge member 1 and the movable member 2 are used for the right hinge device, when the cover is closed, the contact projections 2a, 2b are engaged with the engaging cavities 1a, 1b. When the cover is open, such contact projections 2a, 2b are engaged with the engaging cavities 1c and 1a. Therefore, when the cover rotates to the open position, as shown in FIG. 16, the movable member 2 rotates in the direction of arrow X. If the hinge member 1 and the movable member 2 are used for the left hinge device, when the cover rotates to the open position, the movable member 2 rotates in the direction of arrow Y. When the movable member 2 rotates in the direction of arrow Y, the contact projection 2b is engaged with the engaging cavity 1c on the way of rotation to the open position. Therefore, the cover cannot rotate smoothly. In addition, when the cover reaches its closed position, the contact projection 2b does not reach the engaging cavity 1a, so they cannot be engaged with each other. As a result, the contact projection 2a cannot also be engaged with the engaging cavity 1b. Therefore, it is necessary to form a contact projection 2c instead of the contact projection 2b, as shown with an imaginary line in the Figure on the movable member of the left hinge device. For this reason, in case of a conventional hinge device, the left and right hinges require a dedicated movable member 2. That is, a conventional hinge device requires two kinds of the movable member 2. As a result, the number of parts increases and the manufacturing cost increases.

SUMMARY OF THE INVENTION

To solve the above-mentioned problems, the present invention employs a hinge device for connecting a device body with its cover rotatably between its closed and open positions. The present invention comprises a pair of hinge members which are connected with said device body and said cover respectively and which are connected in such that they can rotate from each other about the rotation axis of said device body and said cover; a movable member which is connected with one of a pair of said hinge members non-rotatably, and which can move in the direction of said rotation axis; and biasing means which presses said movable member against the other hinge member, on one of contact faces of said other hinge member and said movable member which come into contact with each other, a pair of first conversion portions which are separated by 180 degrees from each other in a circumferential direction about said rotation axis, a pair of second conversion portions which are separated by 180 degrees from each other in a circumferential direction about the above-mentioned rotation axis and which are separated by a predetermined angle from said first conversion portions in a circumferential direction, and a pair of positioning cavities which are arranged at a center between said first conversion portion and said second conversion portion are formed; and on the other contact face, a pair of pressing projections are formed, the pair of pressing projections are separated by 180 degrees from each other in a circumferential direction about said rotation axis, come into contact with a pair of said first conversion portions to convert the force of said biasing means into a force for pressing said other hinge member from its open position side to its closed position side when the cover rotates closed position, come into contact with a pair of said second conversion portions to convert the force of said biasing means into a force for pressing said other hinge member from its closed position side to its open position side when the cover rotates open position, and fit into a pair of said positioning cavities to connect a pair of said hinge members with each other properly and non-rotatably; a bottom face defining said positioning cavities is formed by a concave spherical surface; an outer face defining said pressing projection is formed by a convex spherical surface having the same size of that of the concave spherical surface of said positioning cavities.

In this case, it is desirable that said first and second conversion portions are formed on both sides of the circumferential direction about said rotation axis of the bottom face of said positioning cavities. It is also desirable that said first and second conversion portions are formed by the concave spherical surface having the same size of that of said concave spherical surface defining said positioning cavities.

In addition, it is also desirable that said other hinge member is connected with said device body or said cover, and can rotate by a slight angle with respect to said device body or said cover. It is desirable that said other hinge member comprises a contact member which comes into contact with said movable member, and a support member for supporting said contact member against the force of said biasing means, and at least said contact member can rotate by a slight angle about said rotation axis with respect to said device body or said cover with which said other hinge member is connected.

BRIEF DESCRIPTION OF THE DRAWINGS

FIG. 7 shows one hinge member used in the above-mentioned embodiment. FIG. 7 (A) shows a front view of the hinge device. FIGS. 7 (B), (C), and (D) show a hinge member of FIG. 7 (A) viewed in the direction of arrow B, arrow C, and arrow D respectively. FIG. 7 (E) shows a sectional view of FIG. 7 (B) taken along the E—E line.

FIG. 8 shows a cap used in the above-mentioned embodiment. FIG. 8 (A) shows a front view of the cap. FIG. 8 (B) shows a sectional view of the cap taken along the B–B line in FIG. 8 (A). FIG. 8 (C) shows a cap of FIG. 8 (A) viewed in the direction of arrow C. FIG. 8 (D) shows a sectional view of FIG. 8 (C) taken along the D—D line.

FIG. 9 shows a contact member used in the above-mentioned embodiment. FIG. 9 (A) shows a plan view of the contact member. FIG. 9 (B) shows a sectional front view of the contact member. FIG. 9 (C) shows an enlarged plan view of the important parts of the contact member. FIG. 9 (D) shows a sectional view of the contact member of FIG. 9 (C) taken along the D—D line.

FIG. 10 shows a support member used in the above-mentioned embodiment. FIG. 10 (A) shows a front view of the support member. FIG. 10 (B) shows a sectional front view of the support member. FIGS. 10 (C) and (D) show a support member of FIG. 10 (A) viewed in the direction of arrows C and D respectively. FIG. 10 (E) shows a sectional view of the support member of FIG. 10 (A) taken along the E—E line.

FIG. 11 shows a movable member used in the above-mentioned embodiment. FIG. 11 (A) shows a front view of the movable member. FIG. 11 (B) shows a side view of the movable member. FIG. 11 (C) shows a sectional view of the movable member of FIG. 11 (B) taken along the C—C line. FIGS. 11 (D) and (E) show a views of the movable member of FIG. 11 (A) viewed in the direction of arrows D and E respectively.

FIG. 15 shows a hinge member of a conventional hinge device. FIG. 15 (A) shows a plan view of the hinge member.

FIG. 15 (B) shows a sectional view of the hinge member of FIG. 15 (B) taken along the B—B line.

FIG. 16 shows a hinge member of a conventional hinge device. FIG. 16 (A) shows a plan view of the hinge member. FIG. 16 (B) shows a sectional view of the hinge member FIG. 16 (A) taken along the B—B line.

DETAILED DESCRIPTION OF THE INVENTION

An embodiment of the present invention will be described below with reference to FIGS. 1~14. For this embodiment, the hinge device 10 is used to connect a portable telephone body with the cover (frame). However, such hinge device can also be used to connect other equipment, for example, a notebook personal computer and its cover.

Figure 12:
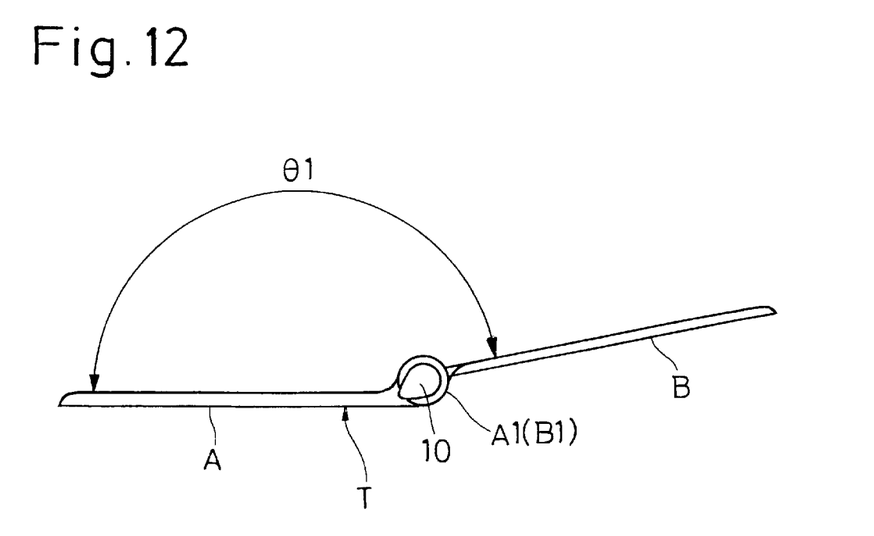
FIG. 12 shows a side view of a portable telephone in which the hinge device of the above-mentioned embodiment is built in on the way of assembly.
Figure 13:
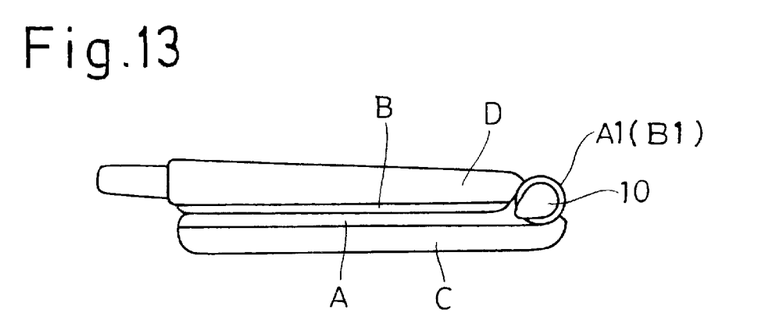
FIG. 13 shows a side view of the portable telephone with the cover rotated to its closed position.
Figure 14:
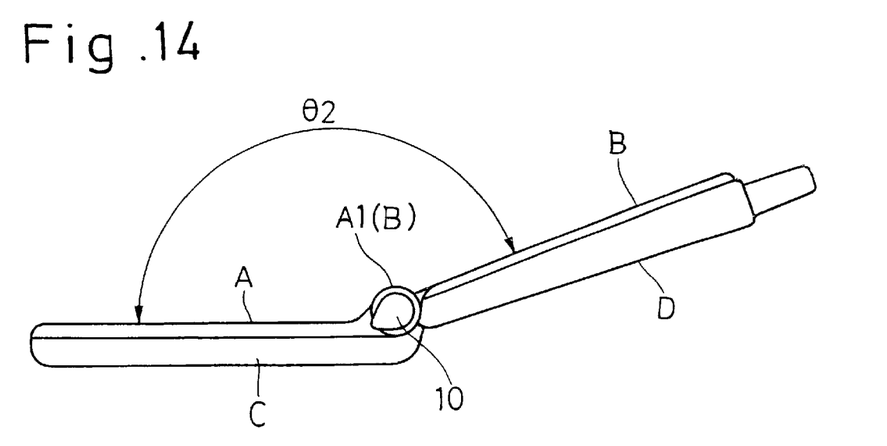
FIG. 14 shows a side view of the portable telephone with the cover rotated to its open position.

A portable telephone using the hinge device 10 will be briefly described below. As shown in FIGS. 12~14, the portable telephone T is equipped with the telephone body A and the cover B which is connected with the telephone body A by means of the hinge device 10. The hinge device 10 is installed under the condition that the angle between the telephone body A and the cover B is θ1. The angle θ1 is an obtuse angle slightly smaller than 180 degrees. For this embodiment, the angle θ1 is about 170 degrees. After the hinge device 10 is installed, decorative boxes C, D are attached to the body A and the cover B respectively. The open position of the cover B is a position where the box C comes into contact with the box D (see FIG. 14). Therefore, the cover B can rotate between a closed position where the cover B comes into contact with the front face of the body A for closing it (in this case, an angle between the body A and the cover B is 0 degree) and an open position where an angle between the body A and the cover B is θ2. The angle θ2 is an obtuse angle which is slightly smaller than the angle θ1. For this embodiment, the angle θ2 is about 160 degrees.

Figure 1:
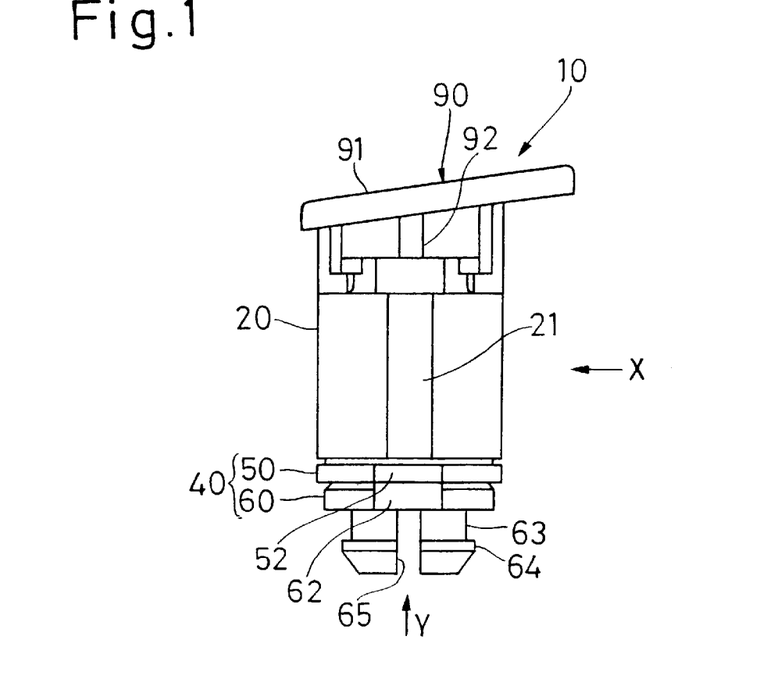
FIG. 1 shows a front view of an embodiment of a hinge device according to the present invention.
Figure 2:
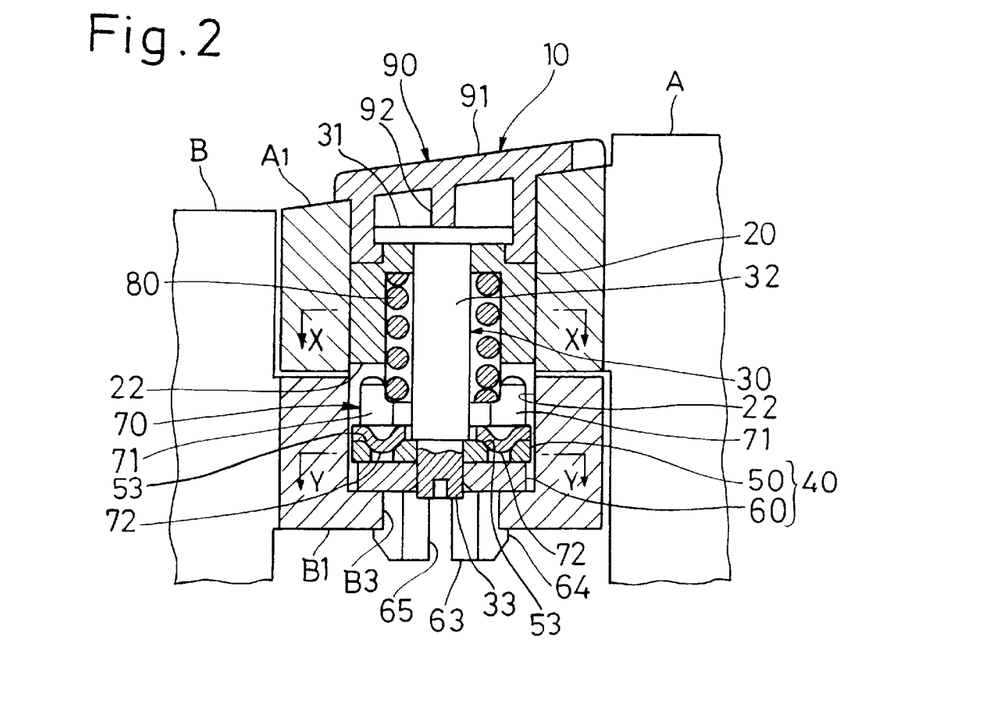
FIG. 2 shows a sectional front view of the hinge device installed on a portable telephone.
Figure 3:
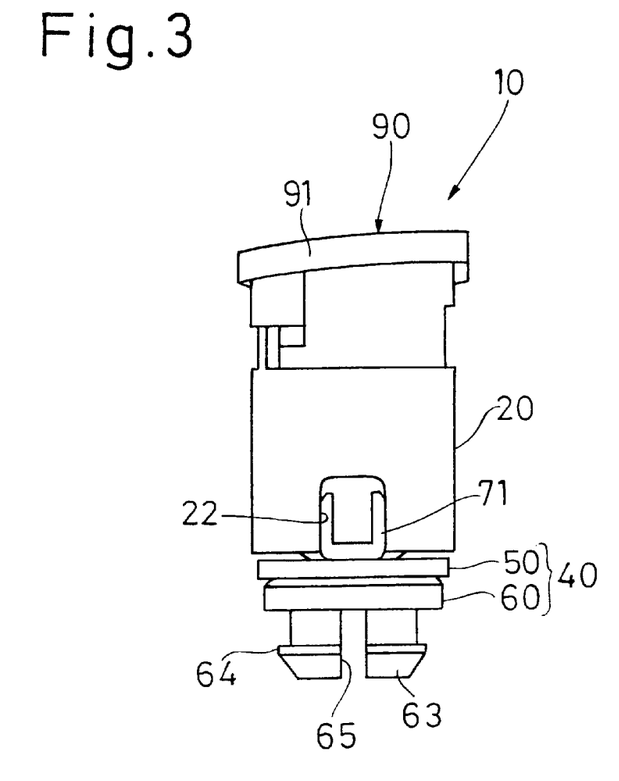
FIG. 3 shows an embodiment of FIG. 1 viewed in the direction of arrow X.
Figure 4:
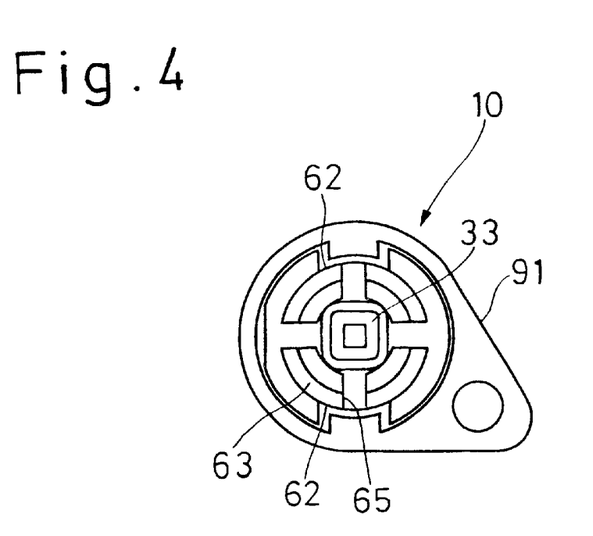
FIG. 4 shows an embodiment of FIG. 1 viewed in the direction of arrow Y.

Next, the hinge device 10 will be described. First, its general configuration will be described. As shown in FIGS. 1~4, the hinge device 10 is equipped with a hinge member 20 and a hinge member 40 which is connected with the hinge member 20 rotatably by means of a connecting shaft 30. As shown in FIG. 2, the hinge device 10 is inserted in the first hinge cylinder A1 of the telephone body A and the second hinge cylinder B1 of the cover B from the first hinge cylinder side A1 (outside), under such condition that their axes are aligned with each other. The base of the hinge member 20 fits into the first hinge cylinder A1 non-rotatably. Its tip is fit into the second hinge cylinder B1 rotatably. Therefore, the body A and the cover B are connected with each other rotatably by means of the hinge member 20. The other hinge member 40 is fit into the second hinge cylinder B almost non-rotatably. However, it can rotate by a slight angle. Therefore, the hinge member 40 rotates together with the cover B1, excluding a slight angle.

The base of the hinge member 20 may be fit into the second hinge cylinder B1 non-rotatably, and its tip into the first hinge cylinder A1 rotatably. In such a case, the hinge member 40 is fit into the first hinge cylinder Al non-rotatably. It is not always necessary to fit the tip of the hinge member 20 into the second hinge cylinder B1 rotatably. In such a case, the cover B is connected with the body A rotatably through the hinge member 40, connecting shaft 30, and hinge member 2. In addition, the hinge member 40 may be connected with the second hinge cylinder B1 non-rotatably so that the hinge member 40 rotates together with the cover B always under such condition that the hinge member 40 could not rotate even by a slight angle with respect to the cover B.

Figure 5:
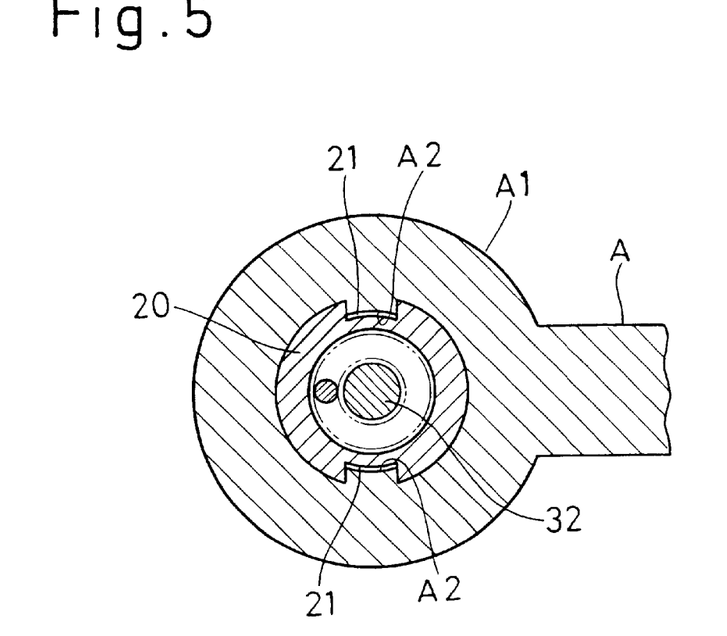
FIG. 5 shows a sectional view taken along the X—X line of FIG. 2.

The hinge device 10 will be described in detail below. The hinge member 20 is cylindrical as shown in FIGS. 1–5 and FIG. 7. On its outer circumference, a pair of key ways 21, 21 extending in an axial direction are arranged with a separation of 180 degrees in a circumferential direction. As shown in FIG. 5, a key A2 formed on the inner circumference of the first hinge cylinder A1 fits into each key way 21. By so doing, the hinge member 20 is connected with the telephone body A non-rotatably. A cap 90 is connected with the outer end of the hinge member 20 (see FIG. 8). The components other than the cap 90 of the hinge device 10 are shielded from the outside by a decorative plate 91 of the cap 90, so the components are not visible from outside.

As shown in FIG. 2, the connecting shaft 30 comprises a disk-shaped head 31, a rotation axis 32 having a circular section, and a fixed shaft 33 having a square-shaped section. The head 31 is almost pinched by means of the outer end of the first hinge cylinder B and the projection 92 of the cap 90. Therefore, the connecting shaft 30 hardly moves in an axial direction. The rotation axis 32 of the connecting shaft 30 is inserted into the hinge member 20 rotatably. The tip of the fixed shaft 33 goes through the hinge member 20 and protrudes out of it. The hinge member 40 is fit fixedly on the tip of the fixed shaft 33.

The hinge member 40 comprises a contact member 50 on the hinge member 20 side and a support member 60 on the opposite side as shown in FIG. 2. As shown in FIGS. 9 and 10 respectively, through holes 51, 61 having square-shaped sections are formed at the centers of the contact member 50 and the support member 60 respectively. The fixed shaft 33 of the connecting shaft 30 goes through the through holes 51, 61. When the fixed shaft 33 is retained by pressure, the contact member 50 and the support member 60 are fixed together with the connecting shaft 30. That is, the contact member 50 and the support member 60 are fixed on the connecting shaft 30 non-rotatably and immovably. In addition, the contact member 50 is substantially in contact with the hinge member 20. As a result, the hinge member 20 is substantially pinched by the head 31 of the connecting shaft 30 and the contact member 50. Thereby, the hinge members 20, 40 are connected almost immovably in a rotation axis direction. By this, hinge device 10 becomes one unit.

Figure 6:
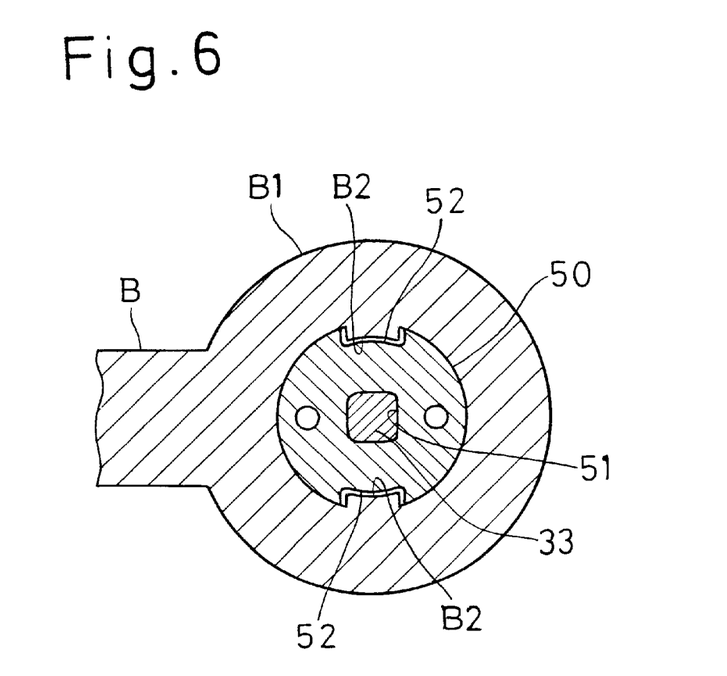
FIG. 6 shows a sectional view taken along the Y—Y line of FIG. 2.
Figure 7A:
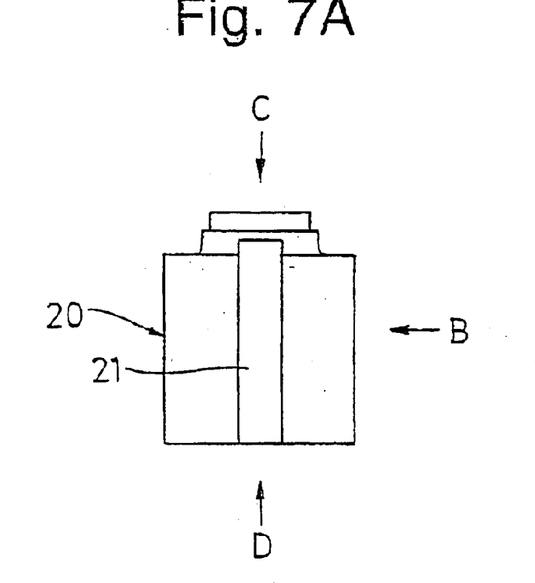
Figure 7B:
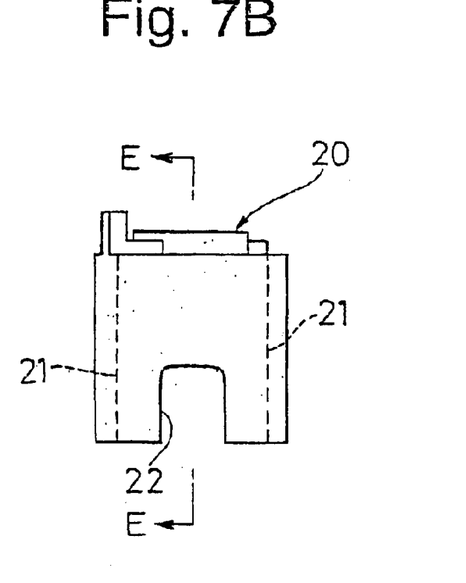
Figure 7C:
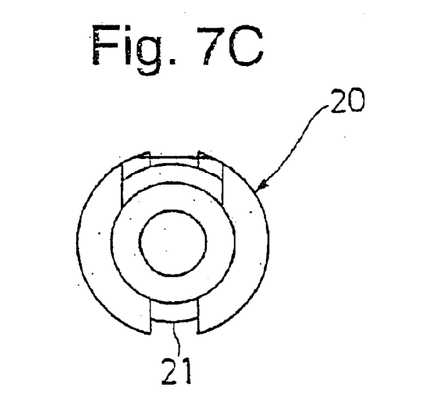
Figure 7D:
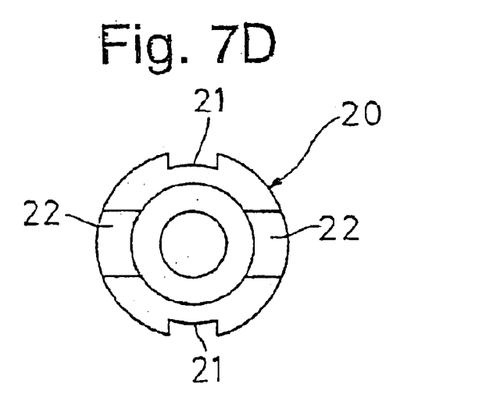
Figure 7E:
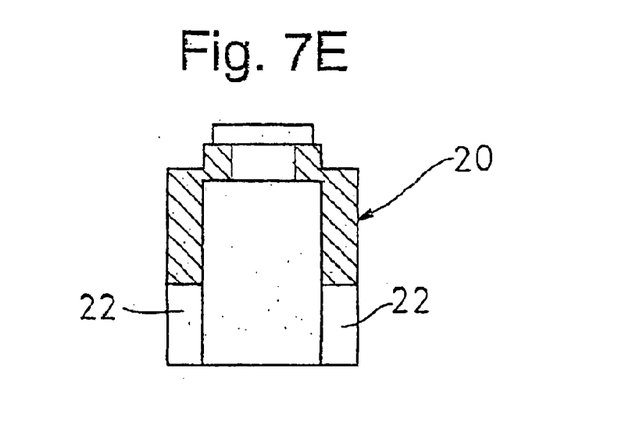
Figure 8A:
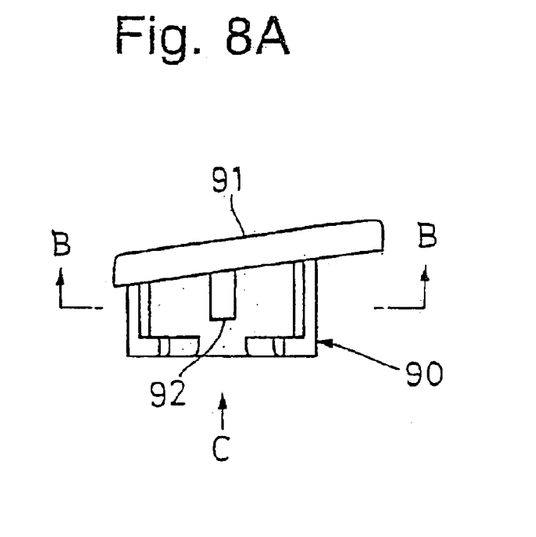
Figure 8B:
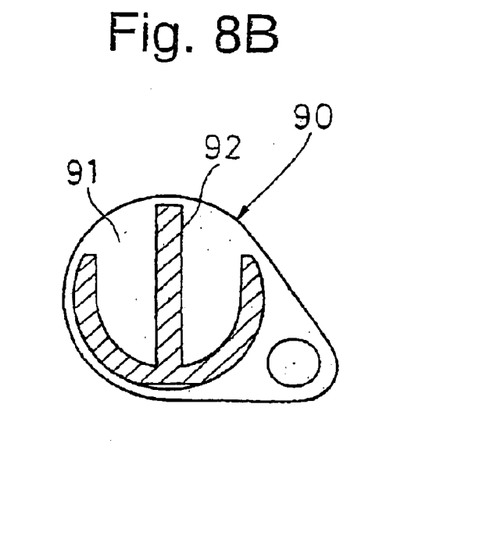
Figure 8C:
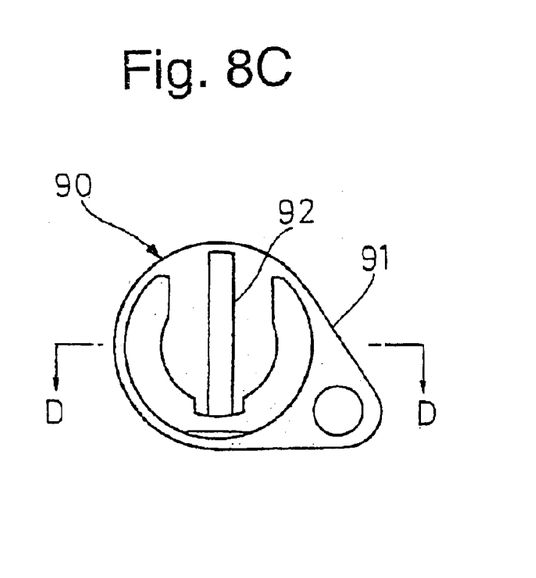
Figure 8D:
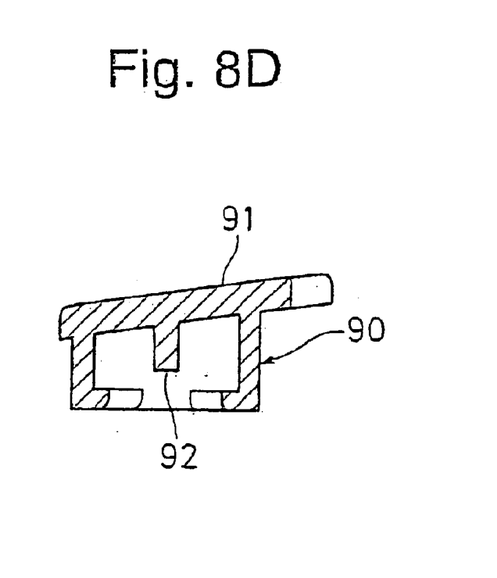

As shown in FIGS. 6 and 10, a pair of the key ways 52, 52 separated by 180 degrees in a circumferential direction are formed on the outer circumference of the contact member 50. As shown in FIGS. 6 and 9, a pair of the key ways 62, 62 are formed on the outer circumference of the support member 60. The key ways 52, 62 are disposed at the same position in a circumferential direction. In addition, the width of the key ways 52, 62 is wider than that of the key way 21. Therefore, if the circumferential positions of the key ways 52, 62, 21 are aligned with each other as well as with the key A2, the contact member 50, the support member 60 and the hinge member 20 can be inserted from the first hinge cylinder A1 to the second hinge cylinder B1.

The key B2 formed on the inner circumferential face of the second hinge cylinder B1 is inserted into the key way 52. The width of the key way 52 is greater than that of the key B2. Therefore, the contact member 50 can make a relative rotation with respect to the cover B by a slight angle corresponding to the difference between the width of the key way 52 and that of the key B2. Of course, except for such a slight angle, the contact member rotates together with the cover B.

The key B2 is also inserted into the key way 62 of the support member 60. However, the width of the key way 62 is greater than that of the key 52. Moreover, the support member 60 is fixed on the connecting shaft 30 together with the contact member 50, so the support member 60 rotates together with the contact member 50. Therefore, the key B2 does not come into contact with the both sides of the key way 62. Thereby, the support member 60 is not directly rotated by the cover B. It is rotated by means of the contact member 50 and the connecting shaft 30.

The key B2 is formed at the positions corresponding to the key ways 52, 62 on the inner circumferential face of the second hinge cylinder B1. The key B2 is not formed at a position into which the hinge member 20 is fit. Therefore, the rotation of the hinge member 20 is not prevented by the key B2.

The key B2 is arranged such that the key B2 and the key A2 are positioned at the same position in a circumferential direction, when the angle between the telephone body A and the cover B becomes 01. Therefore, if the angle between the telephone body A and the cover B is set to 01, and if the positions of the key ways 21, 52, 62 are aligned with the keys A2, B2, the hinge members 20, 40 can be inserted in the first and second hinge cylinders A1, B1.

As shown in FIGS. 2 and 10, the connecting shaft 63 is formed on the end face opposite to the side of the contact member 50 of the support member 60 (bottom side in FIG. 2). An annular projection 64 is formed on the outer circumferential face on the tip side of the connecting shaft 63. A cross-shaped slit 65 is formed on the connecting shaft 63. The cross-shaped slit 65 is extending from the tip to the base of the connecting shaft. The connecting shaft 63 is divided into four parts by this slit 65. Each part can be deformed such that each tip moves toward and away with each other. Thereby the diameter of the connecting shaft 63 can be reduced.

A small diameter portion B3 is formed on the inner circumferential face of the second hinge cylinder B1 opposing to the connecting shaft 63. The inner diameter of this of small diameter portion B3 is set such that it is almost equal to the outer diameter of the connecting shaft 63. The width of the small diameter portion B3 (the width in an axial direction of the second hinge cylinder B1) is almost equal to the length from the base of the connecting shaft 63 to the annular projection 64. Therefore, if the connecting shaft 63 is fit into the small diameter portion 63, the small diameter portion B3 is pinched by the end face of the support member 60 and the annular projection 64. Thereby the support member 60 is fixed on the second hinge cylinder B1. As a result, the hinge device 10 is connected with the telephone body A and the cover B.

If the tip of the connecting shaft 63 is pressed into the small diameter portion B3, the diameter of the tip of the connecting shaft 63 is reduced and the annular projection 64 can pass through the small diameter portion B3. After the annular projection 64 has passed through such portion B3, the connecting shaft 63 restores its original shape, so the connecting shaft 63 is engaged with the small diameter portion B3. At the same time, the small diameter portion B3 is pinched by the end face of the support member 60 and the annular projection 64.

As shown in FIGS. 2 and 9, a pair of the positioning cavities 53, 53 are formed at the end face (the contact face) opposing to the hinge member 20 of the contact member 50. The pair of the positioning cavities 53, 53 are separated by 180 degrees in a circumferential direction about the rotation axis of the telephone body A and the cover B. The bottom face 53a defining the positioning cavities 53 is formed by a part of the concave spherical surface. A through hole 53b that goes through the contact member 50 is formed at the center of the bottom face 53a. The through hole 53b is formed in order to form cavities 53 easily, so the through hole may be omitted.

A guide groove 54 extending in a circumferential direction with the rotation axis as a center is formed between a pair of the cavities 53, 53. The bottom face defining the positioning cavities 54 is formed by an arc surface of the same radius of curvature as the cavity spherical surface defining the positioning cavity 53. However, the depth of the guide groove 54 is considerably shallower than that of the positioning cavity 53.

As shown in FIG. 2, the movable member 70 is disposed in the hinge member 20. Guide portions 71, 71 are formed on both sides of the movable member 70. Each guide portion 71, 71 is slidably inserted in the guide grooves 22, 22 extending in an axial direction formed on the hinge member 20. Therefore, the movable member 7 is connected movably but non-rotatably in its axial direction (in a direction along the rotation axis of the telephone body A and the cover B) with respect to the hinge member 20. The rotation axis 32 of the connecting shaft 30 goes through the center of the movable member 70 in such a way that both relative rotation and relative motion are possible.

The movable member 70 is biased toward the contact member 50 by a coil spring (an biasing means) 80. A pair of the pressing projections 72, 72 are formed on the end face opposing to the contact member 50. Each pressing projection 72 is formed by a convex spherical surface having the same radius of curvature as that of the concave spherical surface defining the positioning cavity 53. Each pressing projection slides in the guide groove 22 when the hinge members 20, 40 rotate relatively. The pressing projections are arranged such that if the key way 21 of the hinge member 20 and the key way 52 of the contact member 50 are aligned in a circumferential direction, they fit into a pair of the positioning cavities 53, 53. When the pressing projections 72 fit into the positioning cavity 53, the hinge members 20, 40 are fixed with each other properly. The hinge members 20, 40 do not make relative rotation unless they are rotated against the biasing force of the coil spring 80. Therefore, the circumferential positions of the key ways 21, 52 can be maintained in an aligned condition by fitting the pressing projection 72 into the positioning cavity 53. Therefore, if the pressing projection 71 is fit into the positioning cavity 53, it is easy to incorporate the hinge members 20, 30 in the first and second hinge cylinders A1, B1 by setting an angle between the telephone body A and the cover B to θ1 and then aligning the circumferential positions of the keys A2, B2 with each other. As a result, the hinge device 1 can be built in the portable telephone T readily.

As shown in FIG. 9, the first and second conversion faces (the first and second conversion portions) 55, 56 are formed on the both sides of the bottom face 53a of each positioning cavity 53 in a circumferential direction. Therefore, a pair of the first conversion faces 55 is formed. They are separated by 180 degrees from each other in a circumferential direction. A pair of the second conversion faces 56 are also formed similarly. They are separated from each other by 180 degrees in a circumferential direction.

Figure 9A:
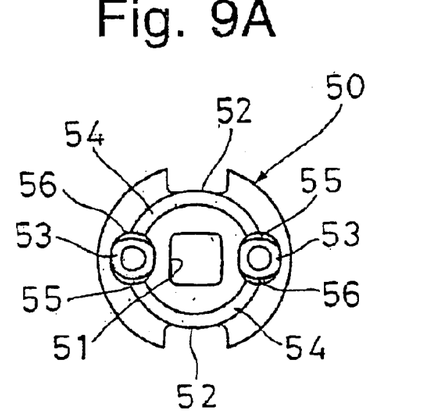
Figure 9B:
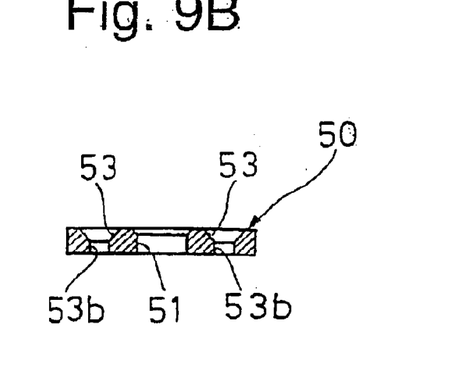
Figure 9C:
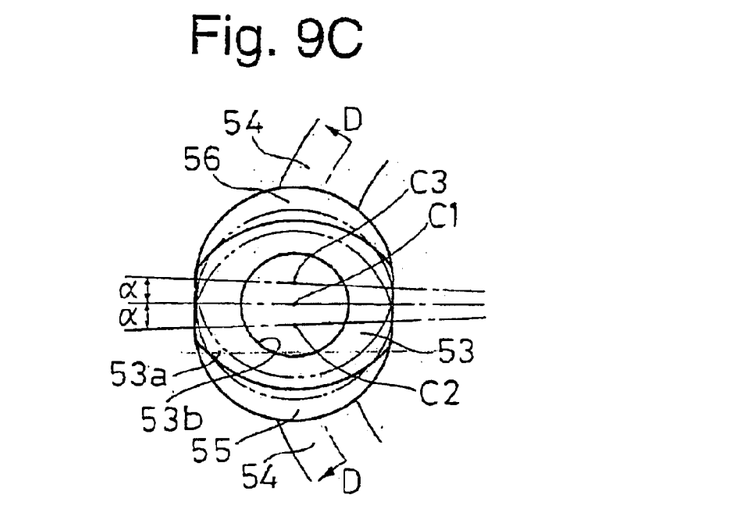
Figure 9D:
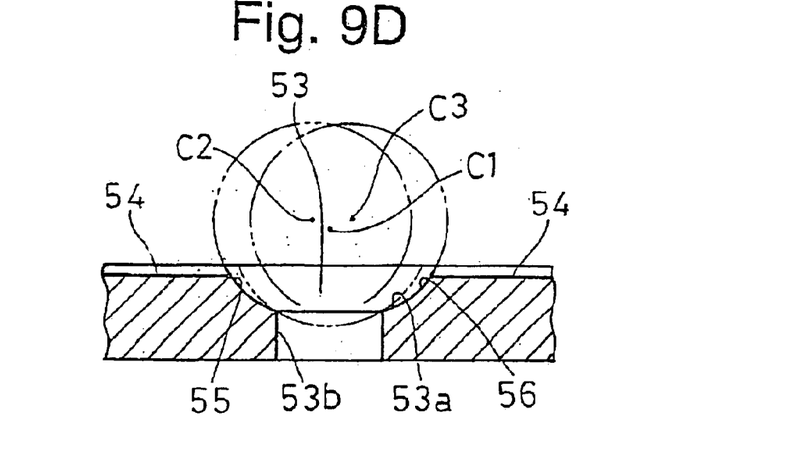
Figure 10A:
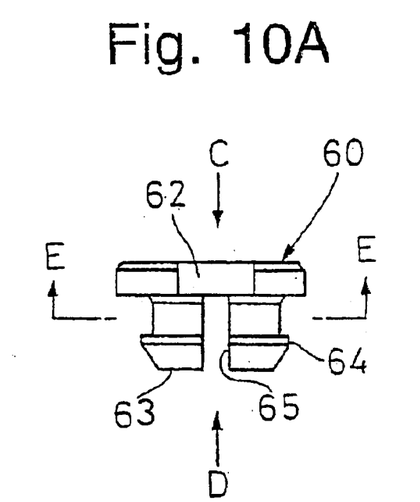
Figure 10B:
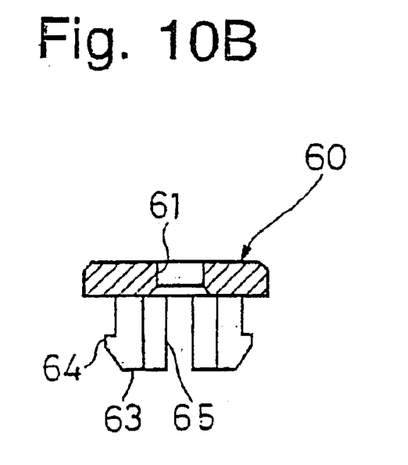
Figure 10C:
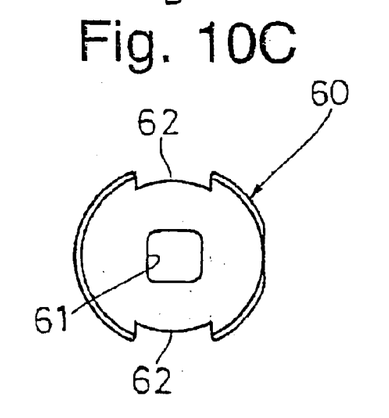
Figure 10D:
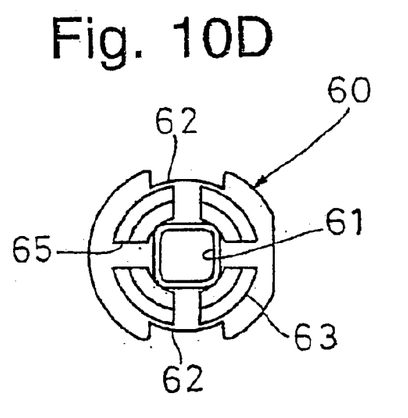
Figure 10E:
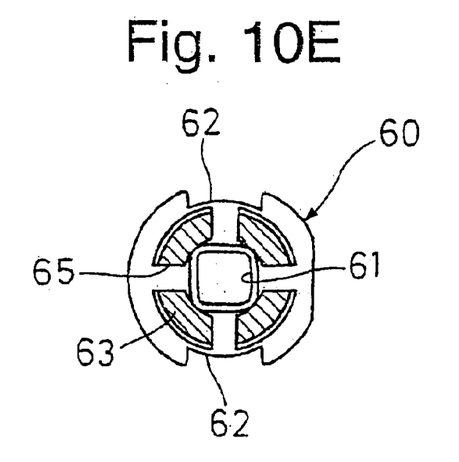
Figure 11A:
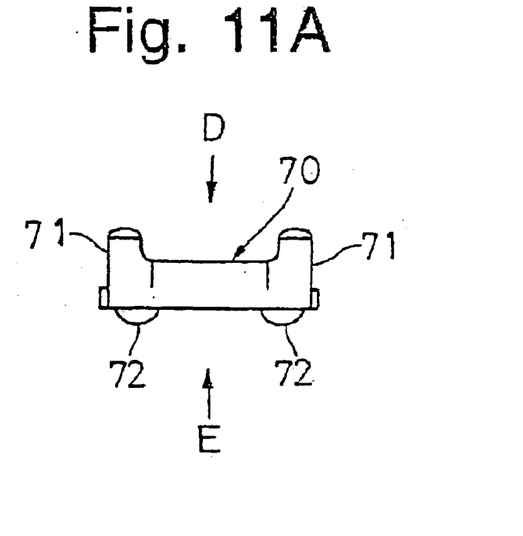
Figure 11B:
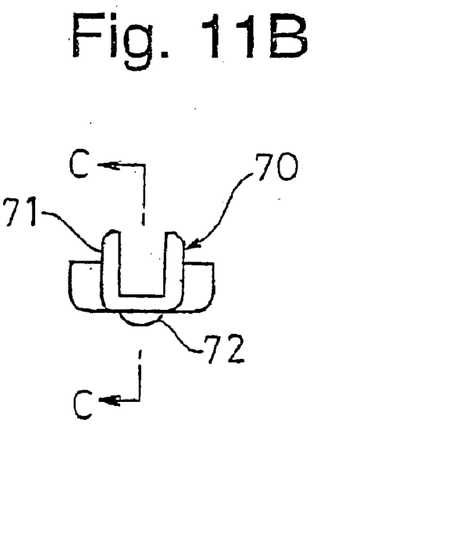
Figure 11C:
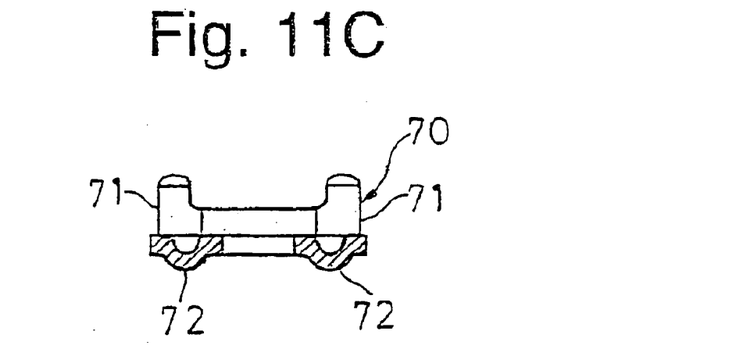
Figure 11D:
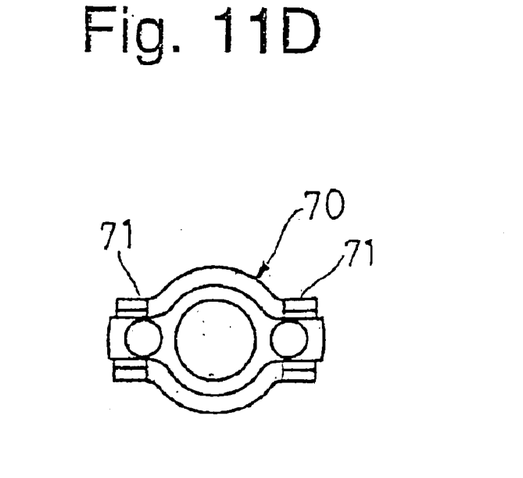
Figure 11E:
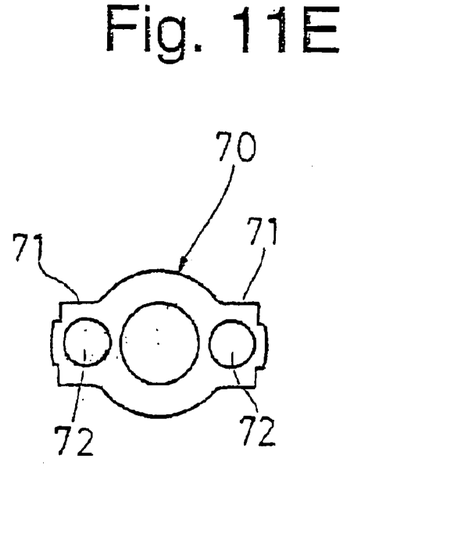

The first and second conversion faces 55, 56 are formed by a concave spherical surface having the same radius of curvature as that of the bottom face 53a of the positioning cavity 53. However, if the center of curvature of the concave spherical surface of the bottom face 53a is C1, and the centers of curvature of the concave spherical surface defining the first and second conversion faces 55 and 56 are C2 and C3, as clearly seen in FIG. 9 (C) and (D), the centers of the curvature C2, C3 are separated from each other by the same angle toward the opposite side of a circumferential direction with respect to the center of curvature C1, and separated from the contact member 50 further than the center of curvature C1. Therefore, the first and second conversion faces 55, 56 incline with respect to the axis of the contact member 50 (the axis of the hinge device 1) and cross the end face of the contact member 50.

The centers of the curvature C2, C3 of the concave spherical surface forming the first and second conversion faces 55, 56 are separated by the angle α in circumferential direction with respect to the center of curvature C1. This angle α is properly set such that when the cover B rotates to a closed position, each one side in a circumferential direction of a pair of the pressing projections 72, 72 comes into contact with a crossed portion between a pair of the first conversion faces 55, 55 and the end face (the contact face) of the contact member 50, and on the other hand, when the cover B rotates to its open position, each other side in a circumferential direction of a pair of the pressing projections 72, 72 comes into contact with a crossed part between a pair of the second conversion faces and the end face of the contact member 50. For this embodiment, θ1 is equal to 170 degrees and θ2 is equal to 160 degrees, so α is set to about 5 to 8 degrees.

When the pressing projection 72 comes into contact with the crossed portion between the first conversion face 55 and the end face of the contact member 50, the movable member 70 biased by the coil spring 80 pushes the cover B in the direction from its open position to its closed position through the contact member 50. When the pressing projection 72 comes into contact with the crossed part between the second conversion face 56 and the end face of the contact member 50, the movable member 70 pushes the cover B in a direction from its open position to its closed position through the contact member 50. The contact member 50 can rotate by a slight angle with respect to the first hinge cylinder B1, so the contact member 50 which is pushed by the movable member 70 rotates by a slight angle. Therefore, the side of the key way 52 comes into contact with the key B2 and produces an impact sound. The rotation of the cover B to its closed position or to its open position can be confirmed by this impact sound.

For the hinge device 10 of the above-mentioned configuration, a pair of the first conversion faces 55, 55 separated by 180 degrees from each other, a pair of the second conversion faces 56, 56 separated by 180 degrees from each other are formed on the contact member 50, and a pair of the pressing projections 72, 72 separated by 180 degrees from each other are formed on the movable member 70. Therefore, the contact member 50 and the movable member 70 can be used for the right and the left hinge device 10. If the hinge device 10 is to be used on the right is employed instead of the hinge device 10 to be used on the left, the pressing projection 72 comes into contact with the second conversion face 56, when the cover B rotates to its closed position. When the cover B rotates to its open position, the pressing projection 72 comes into contact with the first conversion face 56.

The present invention is not limited to the above-mentioned embodiment, but can be modified freely according to applications.

For example, for the embodiment described above, the first and second conversion faces 55, 56 is formed by the concave spherical surface. However such conversion faces can be formed by simple inclined faces inclining in the same direction.

For such embodiment, when the cover B is rotated to its closed or open position, the pressing projections 72 come into contact with the crossed part between the first or the second conversion face 55 or 56 and the end face of the contact member 50. However, such embodiment may be configured such that the pressing projections 72 fit into the first or the second conversion face 55 or 56.

What is claimed is:

1. A hinge device for connecting a device body with its cover rotatably between closed and open positions, comprising:

a pair of hinge members which are connected with said device body and said cover respectively and which are connected such that they can rotate with respect to each other about a rotational axis of said device body and said cover;

a movable member which is connected with one of a pair of hinge members non-rotatably and which can move in the direction of said rotational axis;

a biasing mechanism which presses said movable member against the other hinge member;

said other hinge member and said movable member having contact faces which come into contact with each other;

a pair of first conversion portions on one of said contact faces which are separated by 180 degrees from each other in a circumferential direction about said rotational axis;

a pair of second conversion portions on the one of said contact faces which are separated by 180 degrees from each other in a circumferential direction about the said rotational axis and which are separated by a predetermined angle from said first conversion portions in a circumferential direction, a pair of positioning cavity cavities on the one of said contact faces which are arranged at a center within the predetermined angle of separation between said pairs of first and second conversion portions;

a pair of pressing projections on the other of said contact faces, the pair of pressing projections being separated by 180 degrees from each other in a circumferential direction about said rotational axis;

the pair of said pressing projections coming into contact with the pair of said first conversion portions to convert the force of said biasing mechanism into a force for pressing said other hinge member from its open position toward its closed position when the cover is located at its closed position;

the pair of said pressing projections coming into contact with the pair of said second conversion portions to convert the force of said biasing mechanism into a force for pressing said other hinge member from its closed position toward its open position when the cover is located at its open position;

the pair of said pressing projections fitting into the pair of said positioning cavities to connect the pair of said hinge members with each other by resisting further relative rotation of the other hinge member;

a bottom face defining of each of said positioning cavities being formed on the one of said contact faces by a concave spherical surface; and an outer face of each of said pressing projections being formed by a convex spherical surface having the same size of that of the concave spherical surface of said positioning cavities.

2. The hinge device of claim 1, wherein said first and second conversion portions are formed on opposite sides of the bottom face of said positioning cavities.

3. The hinge device of claim 2, wherein said first and second conversion portions are formed by a concave spherical surface having the same size as that of said concave spherical surface of said positioning cavities.

4. The hinge device of claim 1, wherein said other hinge member is connected with one of said device body and said cover, and can rotate by a slight angle with respect to one of said device body and said cover.

5. The hinge device of claim 4, wherein said other hinge member comprises a contact member which comes into contact with said movable member, and a support member for supporting said contact member against the force of said biasing mechanism, and at least said contact member can rotate by a slight angle about said rotational axis with respect to one of said device body and said cover with which said other hinge member is connected.

* * * * *

UNITED STATES PATENT AND TRADEMARK OFFICE
CERTIFICATE OF CORRECTION

PATENT NO.    : 6,704,418 B1
DATED         : March 9, 2004
INVENTOR(S)   : Shinichiro Koshikawa It is certified that error appears in the above-identified patent and that said Letters Patent is hereby corrected as shown below:

Column 9,
Line 20, delete the word "a" and add the word -- said --
Line 34, delete the word "the"
Line 38, delete the word "cavity"

Column 10,
Line 17, delete the word "defining"

Signed and Sealed this

Twenty-seventh Day of July, 2004

JON W. DUDAS
*Acting Director of the United States Patent and Trademark Office*